United States Patent
Higashiyama et al.

(10) Patent No.: US 11,080,161 B2
(45) Date of Patent: Aug. 3, 2021

(54) CONTROL DEVICE, AND PROCESSING METHOD IN EVENT OF FAILURE IN CONTROL DEVICE

(71) Applicant: MITSUBISHI ELECTRIC CORPORATION, Chiyoda-ku (JP)

(72) Inventors: Tomohiko Higashiyama, Chiyoda-ku (JP); Daisuke Kawakami, Chiyoda-ku (JP); Chihiro Morita, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 227 days.

(21) Appl. No.: 16/347,705

(22) PCT Filed: Dec. 21, 2016

(86) PCT No.: PCT/JP2016/088090
§ 371 (c)(1),
(2) Date: May 6, 2019

(87) PCT Pub. No.: WO2018/116400
PCT Pub. Date: Jun. 28, 2018

(65) Prior Publication Data
US 2019/0258559 A1    Aug. 22, 2019

(51) Int. Cl.
*G06F 11/00*   (2006.01)
*G06F 11/30*   (2006.01)
(Continued)

(52) U.S. Cl.
CPC ........ *G06F 11/3065* (2013.01); *G06F 11/079* (2013.01); *G06F 11/0739* (2013.01);
(Continued)

(58) Field of Classification Search
CPC ............. G06F 11/3065; G06F 11/0739; G06F 11/0751; G06F 11/079; G06F 11/0793;
(Continued)

(56) References Cited

U.S. PATENT DOCUMENTS 7,295,903 B2 *  11/2007  Siebel ................ G05B 23/0251
                                                        340/438
8,132,049 B2 *   3/2012  Yasukawa .......... G03G 15/5079
                                                         714/26
(Continued)

FOREIGN PATENT DOCUMENTS

EP    0654738 B1 *  3/1999  ............. G01R 31/00
JP    4-84222 A     3/1992
(Continued)

OTHER PUBLICATIONS

International Search Report dated Mar. 28, 2017 in PCT/JP2016/088090 filed Dec. 21, 2016.

*Primary Examiner* — Anthony J Amoroso
(74) *Attorney, Agent, or Firm* — Xsensus LLP

(57) ABSTRACT

A control device including a failure diagnosis unit configured to identify a phenomenon that is a cause of the detected error, wherein the failure diagnosis unit is configured to: calculate a diagnosable time available to be spent on the identification of the phenomenon that is the cause of the error; and identify, for each detected error, a phenomenon that is the cause of the error based on a posterior probability, which is calculated for each phenomenon that is likely to be the cause of the error as a probability of occurrence of the phenomenon, on a diagnosis time, which is obtained for each phenomenon as a period of time required to identify the phenomenon as the cause of the error, and on the diagnosable time.

18 Claims, 14 Drawing Sheets

(51) Int. Cl.
　　　*G06F 11/07*　　　(2006.01)
　　　*G06F 11/10*　　　(2006.01)

(52) U.S. Cl.
　　　CPC ...... *G06F 11/0751* (2013.01); *G06F 11/0793* (2013.01); *G06F 11/10* (2013.01); *G06F 11/3058* (2013.01)

(58) Field of Classification Search
　　　CPC .. G06F 11/10; G06F 11/3058; G06F 11/0736; G06F 11/0754; G06F 11/0757; G06F 11/0796
　　　See application file for complete search history.

(56) References Cited

U.S. PATENT DOCUMENTS

| | | | | |
|---|---|---|---|---|
| 8,458,525 | B2 * | 6/2013 | Pargellis | G05B 23/0281 714/37 |
| 2016/0275407 | A1 * | 9/2016 | Aisu | G06F 11/30 |

FOREIGN PATENT DOCUMENTS

| | | | |
|---|---|---|---|
| JP | 2011-199867 A | | 10/2011 |
| JP | 2012053830 A | * | 3/2012 |
| JP | 5389239 B1 | * | 1/2014 |

* cited by examiner

| | | ERROR | | |
|---|---|---|---|---|
| | | ECC ERROR ($E_1$) | COMMUNICATION CRC ERROR ($E_2$) | ·· |
| PHENOMENON | RAM SOFTWARE ERROR ($M_1$) | $P(M_1|E_1)$ | $P(M_1|E_2)$ | ·· |
| | RAM HARDWARE FAILURE ($M_2$) | $P(M_2|E_1)$ | $P(M_2|E_2)$ | ·· |
| | CAN H/W MODULE FAILURE ($M_3$) | $P(M_3|E_1)$ | $P(M_3|E_2)$ | |
| | | · · | · · | · · |

| PHENOMENON | DIAGNOSIS TIME |
|---|---|
| RAM SOFTWARE ERROR | $T(M_1)$ |
| RAM HARDWARE FAILURE | $T(M_2)$ |
| CAN H/W MODULE FAILURE | $T(M_3)$ |
| ⋮ | ⋮ |

| OPERATION MODE | PHENOMENON |
|---|---|
| CONTINUE NORMAL OPERATION AFTER RECOVERY PROCESSING | RAM SOFTWARE ERROR, ROM SOFTWARE ERROR, CACHE SOFTWARE ERROR |
| FAILURE CAUTION OPERATION | COMMUNICATION PATH NOISE |
| OPERATION WITHOUT CAN COMMUNICATION | CAN CONTROLLER FAILURE, CAN TRANSCEIVER FAILURE |
| DISABLE CACHE AND EXECUTE LIGHT LOAD PROCESSING | CACHE HARDWARE FAILURE |
| CONTINUE OPERATION WITHOUT USING FAILURE ADDRESS | RAM HARDWARE FAILURE, ROM HARDWARE FAILURE |
| SWITCH TO STAND-BY SYSTEM AND REQUEST OVERRIDE TO DRIVER | FAILURE TO IDENTIFY PHENOMENON |

| PHENOMENON | PRIOR PROBABILITY |
|---|---|
| RAM SOFTWARE ERROR | $P(M_1)$ |
| RAM HARDWARE FAILURE | $P(M_2)$ |
| CAN CONTROLLER FAILURE | $P(M_3)$ |
| ⋮ | ⋮ |

| | | ERROR | | |
|---|---|---|---|---|
| | | ECC ERROR ($E_1$) | COMMUNICATION CRC ERROR ($E_2$) | ⋯ |
| PHENOMENON | RAM SOFTWARE ERROR ($M_1$) | $P(E_1|M_1)$ | $P(E_2|M_1)$ | ⋯ |
| | RAM HARDWARE FAILURE ($M_2$) | $P(E_1|M_2)$ | $P(E_2|M_2)$ | ⋯ |
| | | ⋮ | ⋮ | ⋮ |

| OPERATION MODE | PHENOMENON | FUNCTION LEVEL |
|---|---|---|
| CONTINUE NORMAL OPERATION AFTER RECOVERY PROCESSING | RAM SOFTWARE ERROR, ROM SOFTWARE ERROR, CACHE SOFTWARE ERROR | 5 |
| FAILURE CAUTION OPERATION | COMMUNICATION PATH NOISE | 4 |
| OPERATION WITHOUT CAN COMMUNICATION | CAN CONTROLLER FAILURE, CAN TRANSCEIVER FAILURE | 3 |
| DISABLE CACHE AND EXECUTE LIGHT LOAD PROCESSING | CACHE HARDWARE FAILURE | 2 |
| CONTINUE OPERATION WITHOUT USING FAILURE ADDRESS | RAM HARDWARE FAILURE, ROM HARDWARE FAILURE | 3 |
| SWITCH TO STAND-BY SYSTEM | FAILURE TO IDENTIFY PHENOMENON | 1 |

CONTROL DEVICE, AND PROCESSING METHOD IN EVENT OF FAILURE IN CONTROL DEVICE

TECHNICAL FIELD

The present invention relates to a control device having an error detection function, and a processing method in the event of a failure in the control device.

BACKGROUND ART

A control device required to be reliable generally has an error detection function of detecting a failure or an abnormality in the control device. The error detection function is not always successful in identifying a phenomenon that is the cause of an error because there may be more than one phenomenon considered as a possible cause.

There is a method for addressing this with the use of a failure analysis method, for example, fault tree analysis (FTA). FTA is applied to a detected error to list basic phenomena that are possible causes of the error, and the basic phenomena are analyzed to find a phenomenon that is the cause.

There is known an equipment diagnosis device to which this method is applied (see Patent Literature 1, for example). The device uses the Bayesian method to calculate the posterior probability of a phenomenon that may be the cause of a detected error based on a prior probability, which is calculated, for each phenomenon, from data of an observation conducted in advance, as the probability of occurrence of the phenomenon, and on a likelihood value, which is a phenomenon's probability of causing the error. Then, the device conducts a diagnosis for finding out the cause in descending order of posterior probability.

CITATION LIST

Patent Literature

[PTL 1] JP 04-84222 A

SUMMARY OF INVENTION

Technical Problem

In the equipment diagnosis device described in Patent Literature 1, however, no consideration is made to the time required to identify the causal phenomenon, and the diagnosis is accordingly required to be conducted under a state in which a system to which the device is applied is stopped. The resultant problem is that the equipment diagnosis device described in Patent Literature 1 is not applicable to a system required to keep operating even when an error is detected, by switching to a fallback operation mode or a similar mode.

The present invention has been made to solve the problem described above, and an object of the present invention is to provide a control device capable of allowing a system to which the control device is applied to, to the extent possible, keep operating without stopping even when an error is detected, by function fallback or other measures, and capable of identifying a phenomenon that is the cause of the error, and to provide a processing method in the event of a failure in the control device.

Solution to Problem

According to one embodiment of the present invention, there is provided a control device including: an error detection unit configured to detect an error that has occurred in the control device; and a failure diagnosis unit configured to identify a phenomenon that is a cause of the detected error, which is detected by the error detection unit, wherein the failure diagnosis unit is configured to: calculate a diagnosable time available to be spent on the identification of the phenomenon that is the cause of the error; and identify, for each detected error detected by the error detection unit, a phenomenon that is the cause of the error based on a posterior probability, which is calculated for each phenomenon that is likely to be the cause of the error as a probability of occurrence of the phenomenon, on a diagnosis time, which is obtained for each phenomenon as a period of time required to identify the phenomenon as the cause of the error, and on the diagnosable time.

Further, according to another embodiment of the present invention, there is provided a processing method in the event of a failure in a control device, which is executed in the control device including: an error detection unit configured to detect an error that has occurred in the control device; and a failure diagnosis unit configured to identify a phenomenon that is a cause of the detected error, which is detected by the error detection unit, the processing method including the steps of: calculating, by the failure diagnosis unit, a diagnosable time available to be spent on the identification of the phenomenon that is the cause of the error; and identifying, by the failure diagnosis unit, for each detected error detected by the error detection unit, a phenomenon that is the cause of the error based on a posterior probability, which is calculated for each phenomenon that is likely to be the cause of the error as a probability of occurrence of the phenomenon, on a diagnosis time, which is obtained for each phenomenon as a period of time required to identify the phenomenon as the cause of the error, and on the diagnosable time.

Advantageous Effects of Invention

According to the control device of one embodiment of the present invention and the processing method in the event of a failure in the control device of another embodiment of the present invention, the failure diagnosis unit calculates the diagnosable time, which indicates a period of time available to be spent on the identification of a phenomenon that is the cause of an error, and identifies, for each error detected by the error detection unit, a phenomenon that is the cause of the error based on the posterior probability, which is calculated for each phenomenon that is likely to be the cause of the error as the probability of occurrence of the phenomenon, and on the diagnosis time, which is calculated for each phenomenon as the period of time required to identify the phenomenon as the cause of the error.

It is therefore possible to allow a system to which the control device is applied to, to the extent possible, keep operating without stopping even when an error is detected, by function fallback or other measures, and to identify a phenomenon that is the cause of the error.

BRIEF DESCRIPTION OF DRAWINGS

FIG. 6 is an explanatory diagram for illustrating a diagnosis time table of the control device according to the first embodiment of the present invention.

FIG. 7 is an explanatory diagram for illustrating an operation mode determination table of the control device according to the first embodiment of the present invention.

FIG. 17 is an explanatory diagram for illustrating an operation mode determination table of a control device according to a fifth embodiment of the present invention.

DESCRIPTION OF EMBODIMENTS

A description is now given of a control device and a processing method in the event of a failure in the control device according to preferred embodiments of the present invention with reference to the accompanying drawings, and throughout the drawings, like or corresponding components are denoted by like reference symbols to describe those components.

First Embodiment

Figure 1:
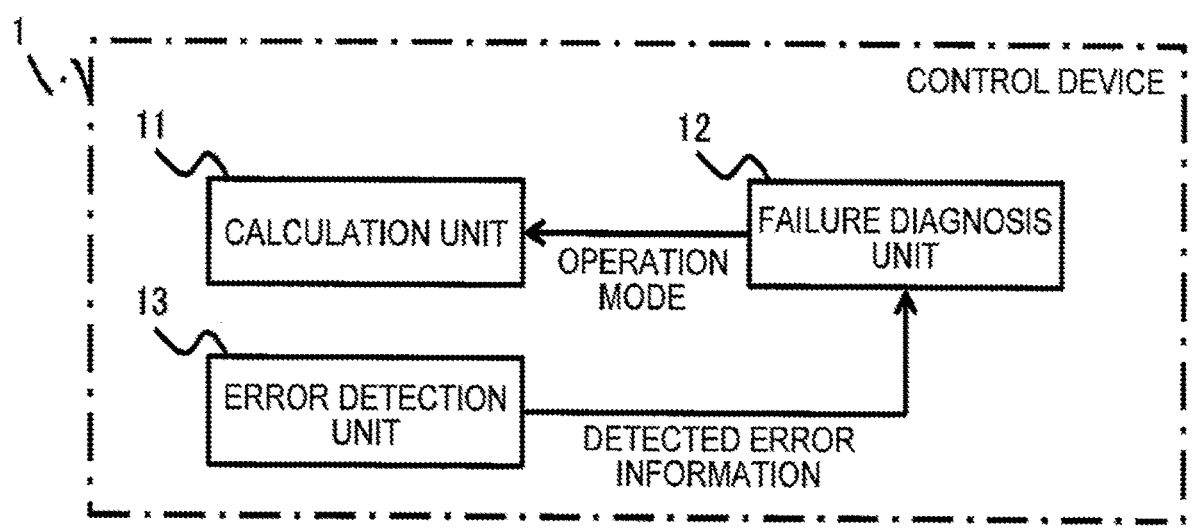
FIG. 1 is a block diagram for illustrating a control device according to a first embodiment of the present invention.

FIG. 1 is a block diagram for illustrating a control device according to a first embodiment of the present invention. In FIG. 1, a control device 1 includes a calculation unit 11 configured to perform control calculation, which is a main function of the control device 1, a failure diagnosis unit 12 configured to identify a phenomenon that is the cause of an error, and an error detection unit 13 configured to detect an error that has occurred in the control device 1.

When detecting an error that has occurred in the control device 1, the error detection unit 13 notifies the error to the failure diagnosis unit 12. The failure diagnosis unit 12 identifies a phenomenon that is the cause of the error, and notifies the next operation mode adapted to the phenomenon to the calculation unit 11.

Figure 2:
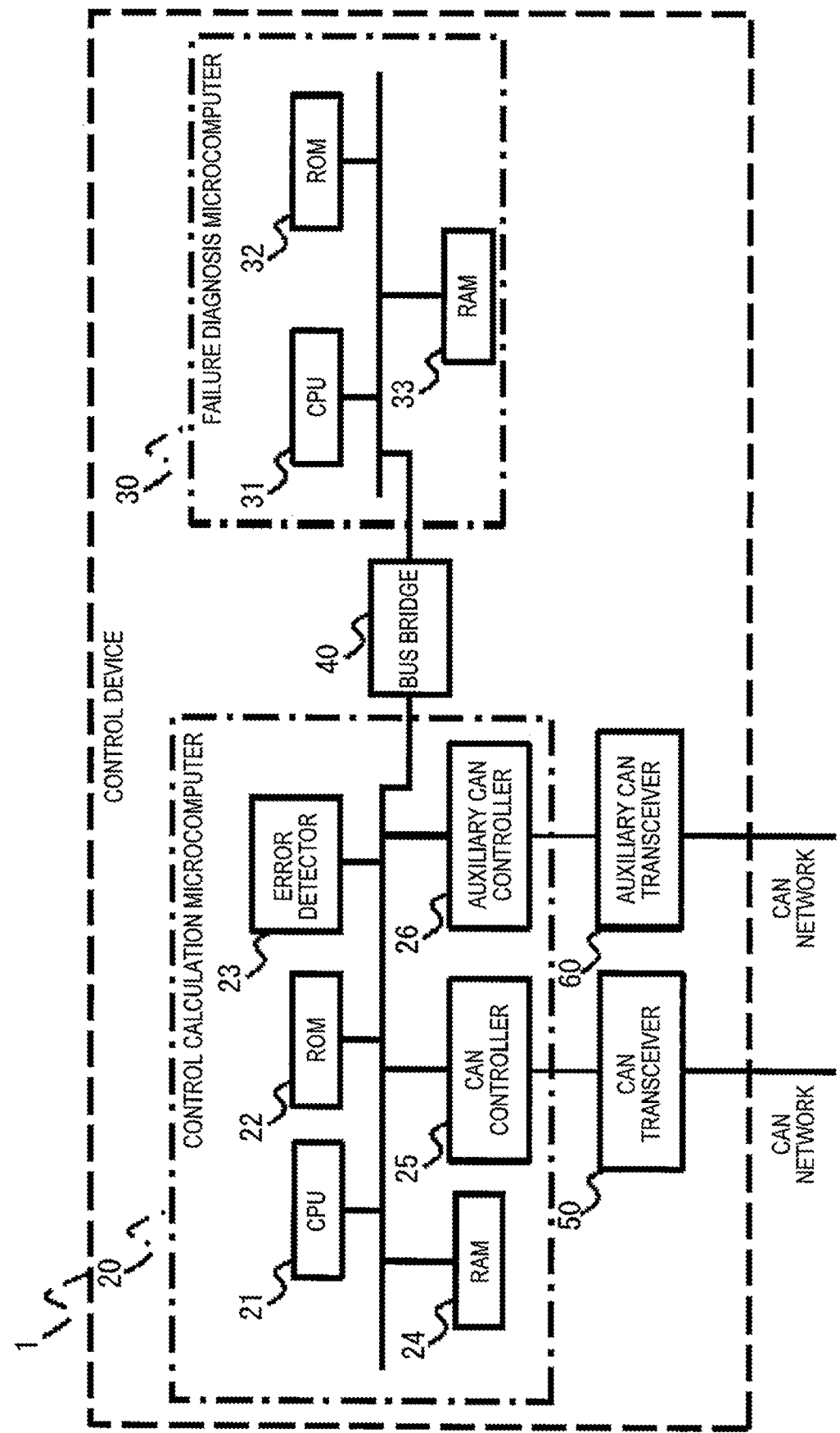
FIG. 2 is a diagram for illustrating a hardware configuration of the control device according to the first embodiment of the present invention.

FIG. 2 is a diagram for illustrating a hardware configuration of the control device according to the first embodiment of the present invention. In FIG. 2, the control device 1 includes a control calculation microcomputer 20 and a failure diagnosis microcomputer 30. The control calculation microcomputer 20 is assumed to be a microcomputer configured to perform control calculation, which is a main function of the control device 1. The failure diagnosis microcomputer 30 is assumed to be a microcomputer configured to identify a phenomenon that is the cause of a detected error. Hardware may hereinafter be notated as "H/W".

The control calculation microcomputer 20 includes a CPU 21, a ROM 22, an error detector 23, a RAM 24, a Controller Area Network (CAN) controller 25, and an auxiliary CAN controller 26. The error detector 23 is a module configured to detect an error that has occurred in the microcomputer. The failure diagnosis microcomputer 30 includes a CPU 31, a ROM 32, and a RAM 33. The control calculation microcomputer 20 and the failure diagnosis microcomputer 30 are connected to each other by a bus bridge 40.

The control device 1 also includes a CAN transceiver and an auxiliary CAN transceiver 60 outside the control calculation microcomputer 20, and is connected to a CAN network via the CAN transceiver 50 and the auxiliary CAN transceiver 60. Normally, CAN communication is held with the use of the CAN controller 25 and the CAN transceiver 50, and, when the CAN controller 25 and the CAN transceiver 50 have failed, the auxiliary CAN controller 26 and the auxiliary CAN transceiver 60 are used to hold CAN communication.

The calculation unit 11 illustrated in FIG. 1 corresponds to a part of the control calculation microcomputer 20 that remains after excluding the error detector 23, and the CAN transceiver 50 and the auxiliary CAN transceiver 60. The failure diagnosis unit 12 illustrated in FIG. 1 corresponds to the failure diagnosis microcomputer 30. The error detection unit 13 illustrated in FIG. 1 corresponds to the error detector 23.

The control calculation microcomputer 20 and the failure diagnosis microcomputer 30 are independent of each other, and are assumed to be designed so that the failure diagnosis microcomputer 30 can operate unaffected by an error that has occurred in the control calculation microcomputer 20. The failure diagnosis microcomputer 30 may be implemented as a field-programmable gate array (FPGA).

Figure 3:
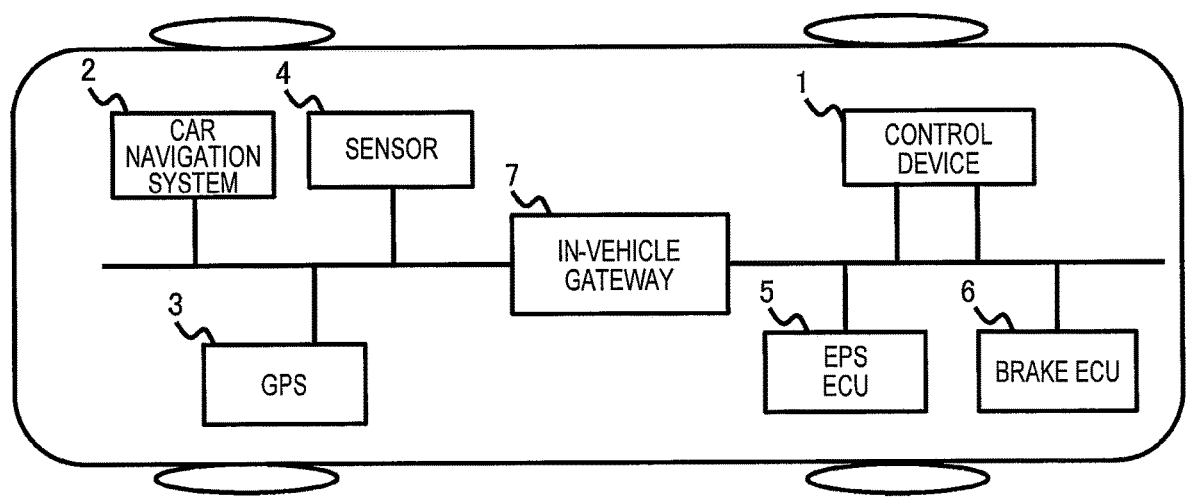
FIG. 3 is a block diagram for illustrating a state in which the control device according to the first embodiment of the present invention is applied to a controller for an automated driving system for an automobile.

FIG. 3 is a block diagram for illustrating a state in which the control device according to the first embodiment of the present invention is applied to a controller for an automated driving system for an automobile. In FIG. 3, devices to be connected to the outside of a vehicle, including a car navigation system 2, a global positioning system (GPS) 3, and a sensor 4, are connected to a network, in-vehicle control electronic control units (ECUs) including an electric power steering engine control unit (EPS ECU) 5 and a brake ECU 6 are connected to another network, and the networks are connected to each other by an in-vehicle gateway 7.

The control device 1 is connected to the latter network to receive information of the GPS 3 and the sensor 4, calculate control command values of the EPS ECU 5 and the brake ECU 6, and output the control command values to the ECUs. However, the control device 1 according to the first embodiment of the present invention is not limited to application to a controller for an automated driving system, and is applicable to various systems.

Figures 4, 5:
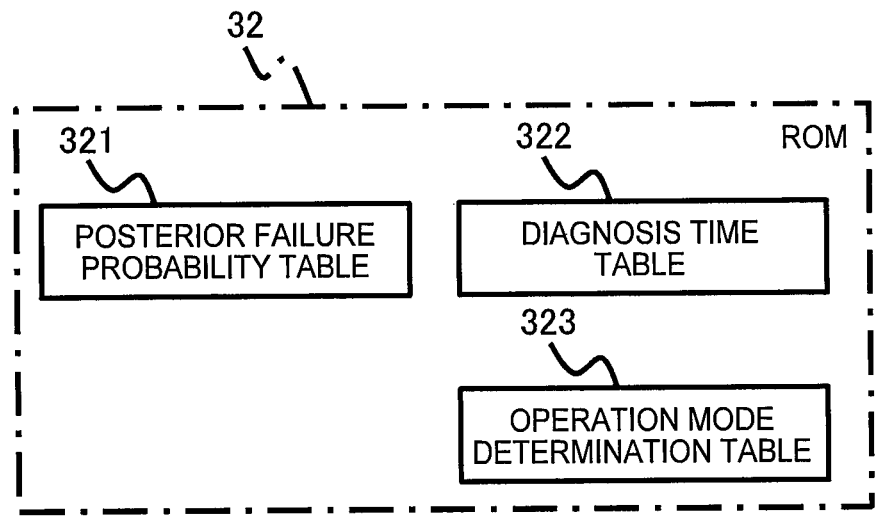
FIG. 4 is an explanatory diagram for illustrating a table that is stored on a ROM in a failure diagnosis microcomputer of the control device according to the first embodiment of the present invention.
FIG. 5 is an explanatory diagram for illustrating a posterior failure probability table of the control device according to the first embodiment of the present invention.

FIG. 4 is an explanatory diagram for illustrating a table that is stored on the ROM in the failure diagnosis microcomputer of the control device according to the first embodiment of the present invention. In FIG. 4, the ROM 32 stores a posterior failure probability table 321, a diagnosis time table 322, and an operation mode determination table 323.

FIG. 5 is an explanatory diagram for illustrating a posterior failure probability table of the control device according to the first embodiment of the present invention. In FIG. 5, a posterior failure probability table 321 is a matrix table for showing a phenomenon that may be the cause of an error and an error that may be caused.

Only phenomena whose occurrence affects the choice of the next operation of the system are registered in the table's phenomenon field. Phenomena in the phenomenon field may be registered on a failure mode basis, a hardware module basis, or a function module basis.

For example, when a cyclic redundancy check (CRC) error has occurred in CAN communication, phenomena that may be the cause of the error are, on a hardware module basis, failures in a communication path, the CAN controller, the CAN transceiver, a memory on which transmission/reception data is stored, and other components.

A failure in a communication path and a failure in the memory change the next operation depending on the mode of the failure. That is, while communication is likely to recover by retransmission of data when a failure in a communication path is caused by a temporary noise, a failure in a communication path due to wire breakage requires the CAN communication function to be cut off for fallback operation.

In the case of a failure in the memory, communication is recoverable by the writing of a correct value when the cause of the failure is bit inversion due to a radiation ray. When a failure in the memory is a hardware failure such as the fixation of a bit to a particular value or a coupling failure, however, communication recovery using the affected RAM area is difficult, and possible next operation is accordingly to change the address at which data is stored or, when a redundant system is built in, to shift to the stand-by system.

Of the hardware modules described above, the recovery of CAN communication is difficult in the case of a failure in the CAN controller and a failure in the CAN transceiver make, and therefore the CAN communication function is required to be cut off for fallback operation.

For the reasons given above, the mode of the failure is registered in the phenomenon field for a phenomenon related to a communication path or the memory, and a phenomenon related to the CAN transceiver or the CAN controller is registered in the phenomenon field as a CAN hardware module failure in the example given above.

For each element in the posterior failure probability table 321, a conditional probability at which the phenomenon occurs under the condition that the error is detected is stored as a posterior probability. How to obtain the posterior probability is described below. First, a posterior probability $P(M_j|E_i)$ of a phenomenon $M_j$ that is the cause of an error $E_i$ is expressed by the Bayesian method as Expression (1).

$$P(M_j | E_i) = \frac{P(M_j) \cdot P(E_i | M_j)}{P(E_i)} \tag{1}$$

In Expression (1), $P(M_j)$ represents a prior probability at which the phenomenon $M_j$ occurs, and $P(E_i|M_j)$ represents a probability at which the phenomenon $M_j$ occurs when the error $E_i$ is detected, namely, a likelihood value. $P(E_i)$ is expressed by Expression (2).

$$P(E_i) = \Sigma P(M_j) \cdot P(E_i|M_j) \tag{2}$$

This is common to every phenomenon that may be the cause of an error. In the first embodiment of the present invention, the aim is to evaluate phenomena that may be the cause of an error by comparison, and the posterior probability $P(M_j|E_i)$ is accordingly expressed by Expression (3).

$$P(M_j|E_i) \sim P(M_j) \cdot P(E_i|M_j) \tag{3}$$

The prior probability $P(M_j)$ is the proportion of the number of times a phenomenon of interest occurs to the number of times of occurrences of all phenomena. The prior probability may be calculated as, for example, the proportion of the occurrence rate of a phenomenon of interest to the sum of occurrence rates of phenomena, with the occurrence rate of each phenomenon being a failure rate that is provided from a hardware vendor or other sources. To give another example, the prior probability may be calculated as the number of times a phenomenon of interest occurs to the total number of occurrences of all phenomena, based on past failure count data on the same product or the same part.

The likelihood value $P(E_i|M_j)$ may be obtained theoretically or may be obtained based on data of an observation conducted in advance. To theoretically obtain the likelihood value $P(E_i|M_j)$ of a communication CRC error associated with a software error of the memory, a method of calculating the communication buffer size to the capacity of the memory is conceivable, for example.

To obtain the likelihood value $P(E_i|M_j)$ based on data of an observation conducted in advance, there is conceivable simulation of bit inversion, for example, in which a failure is input and the probability of error detection when the system is put into operation is calculated. The posterior probability of a phenomenon is obtained by the method described above, and the posterior probability calculated by Expression (3) is stored for each phenomenon in the posterior failure probability table 321.

FIG. 6 is an explanatory diagram for illustrating the diagnosis time table of the control device according to the first embodiment of the present invention. In FIG. 6, the diagnosis time table 322 has a field for storing a phenomenon that may be the cause of an error, and a field for storing, for each phenomenon, a diagnosis time for identifying the phenomenon as the cause of the error.

In the case of a software error of the RAM, for example, there is conceivable a method of obtaining the diagnosis time by writing a specific value to a bit at which the error has occurred, rereading the value, and making a diagnosis based on whether the reread value is the same as the written value. When a phenomenon of interest is identified as the cause of the error as the result of the diagnosis, the diagnosis time may include a time required for a shift to the subsequent operation mode.

For example, in the case of a system designed so that a CAN hardware module failure triggers a switch to an operation mode in which control processing is executed in the auxiliary CAN hardware module, the time required for a shift to the subsequent operation mode is the time required to execute the initialization of required hardware, notification to another device, and the like, and to jump to an address at which a hardware module control processing program is stored.

FIG. 7 is an explanatory diagram for illustrating the operation mode determination table of the control device according to the first embodiment of the present invention. In FIG. 7, the operation mode determination table 323 has a field for an operation mode and a field for a phenomenon associated with the operation mode. In the first embodiment of the present invention, the identification of a phenomenon that is the cause of an error is followed by a shift to an operation mode associated with the phenomenon.

However, the identification of a phenomenon that is the cause of an error may not always be successful because there is a possibility that not all phenomena can be diagnosed within an acceptable function suspension time, which is a function suspension time acceptable to the system. In anticipation for this, a safe state defined in advance is stored in the operation mode determination table 323 as an operation mode for when a phenomenon that is the cause of an error cannot be identified.

An example in which a redundant system is built in to shift to the stand-by system when a phenomenon that is the cause of an error cannot be identified is illustrated in FIG. 7. The control device 1 in this example is assumed to be a controller for an automated driving system, which is always required to keep operating despite a failure. In an operation mode registered in the example, when a phenomenon that is the cause of the error cannot be identified, a shift to the stand-by system is executed to continue the operation of the control device 1 for a while, and an override request for turning over the command of drive operation to the driver is issued during that time.

The stand-by system in this case is to be highly reliable and designed so that any other phenomenon, namely, failure, has no effect on the stand-by system, that is, so that a dependent failure is avoided. However, when the control device 1 is allowed to cease operation in the event of a serious failure, an emergency shutdown mode in which the operation is ceased upon failure to identify a phenomenon that is the cause of an error may be defined in the operation mode determination table.

Figure 8:
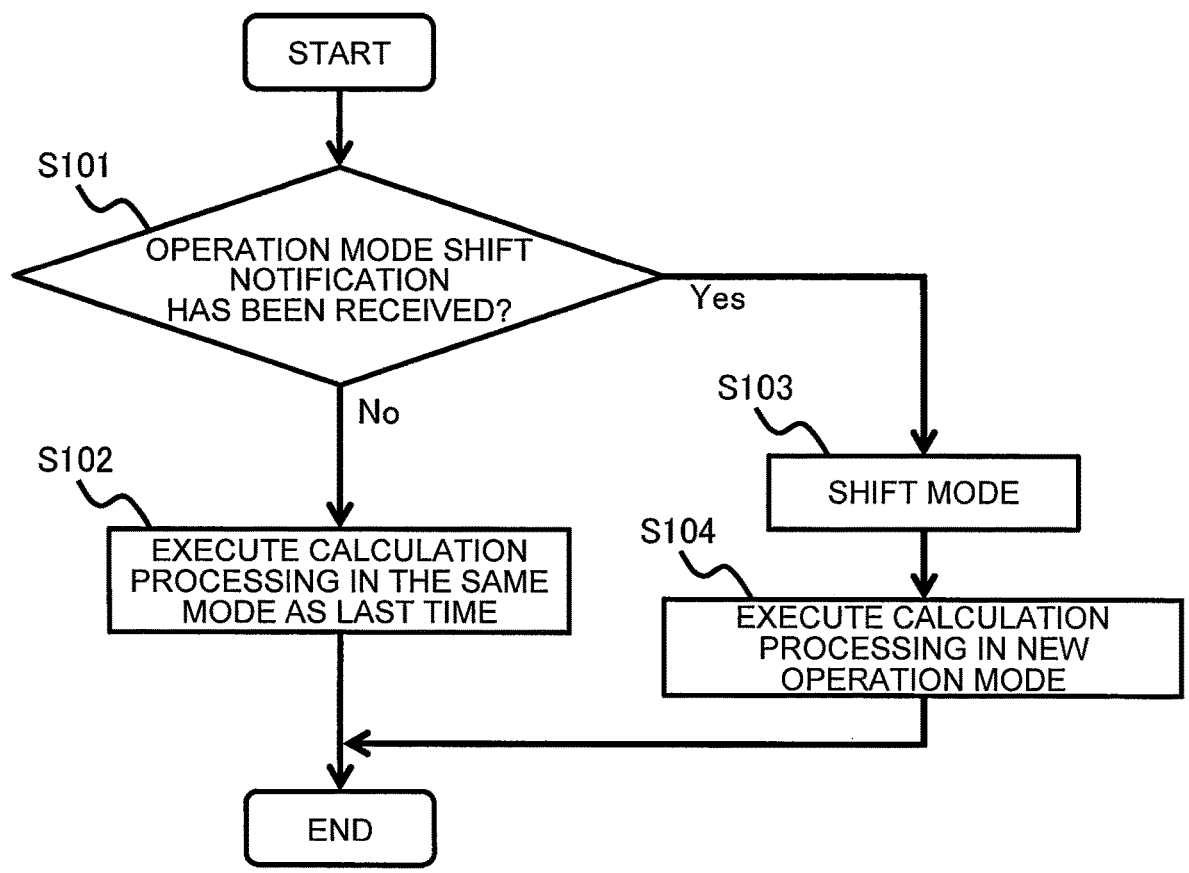
FIG. 8 is a flow chart for illustrating processing to be executed in a calculation unit of the control device according to the first embodiment of the present invention.

FIG. 8 is a flow chart for illustrating processing to be executed in the calculation unit of the control device according to the first embodiment of the present invention. The processing of FIG. 8 is assumed to be activated cyclically by the calculation unit 11, but may be started with an event as a trigger.

In FIG. 8, the calculation unit 11 is activated and first determines whether an operation mode shift notification has been received from the failure diagnosis unit 12 (Step S101).

When it is determined in Step S101 that no shift notification has been received (i.e., when the determination is "No"), the calculation unit 11 executes calculation processing in the same operation mode as in the last activation (Step S102), and ends the processing of FIG. 8.

When it is determined in Step S101 that the shift notification has been received (i.e., when the determination is "Yes"), on the other hand, the calculation unit 11 executes a mode shift to a specified operation mode (Step S103), executes calculation processing in the changed operation mode (Step S104), and ends the processing of FIG. 8.

Figure 9:
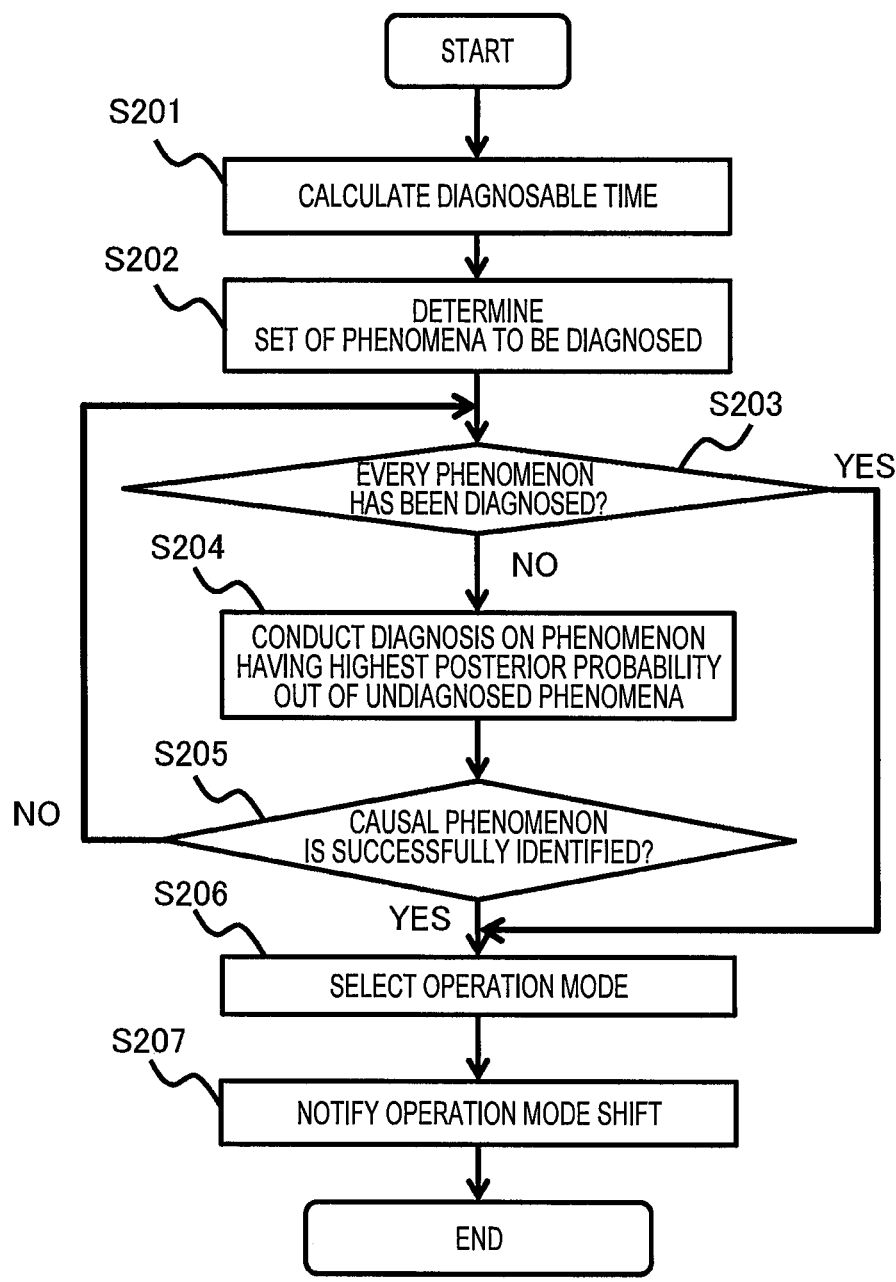
FIG. 9 is a flow chart for illustrating processing to be executed in a failure diagnosis unit of the control device according to the first embodiment of the present invention.

FIG. 9 is a flow chart for illustrating processing to be executed in the failure diagnosis unit of the control device according to the first embodiment of the present invention. The processing of FIG. 9 is activated by the failure diagnosis unit 12 when an error is detected by the error detection unit 13.

In FIG. 9, the failure diagnosis unit 12 is activated and first calculates a diagnosable time (Step S201). The diagnosable time is the length of time from a time point at which Step S201 is executed to a time point at which the system falls into a dangerous state. The diagnosable time varies depending on the system's specifications.

For instance, the diagnosable time may be the length of time from the current time to the next deadline when control processing of the calculation unit 11 that is a main function is cyclic processing. An example of the diagnosable time in this case is illustrated in FIG. 10.

Figure 10:
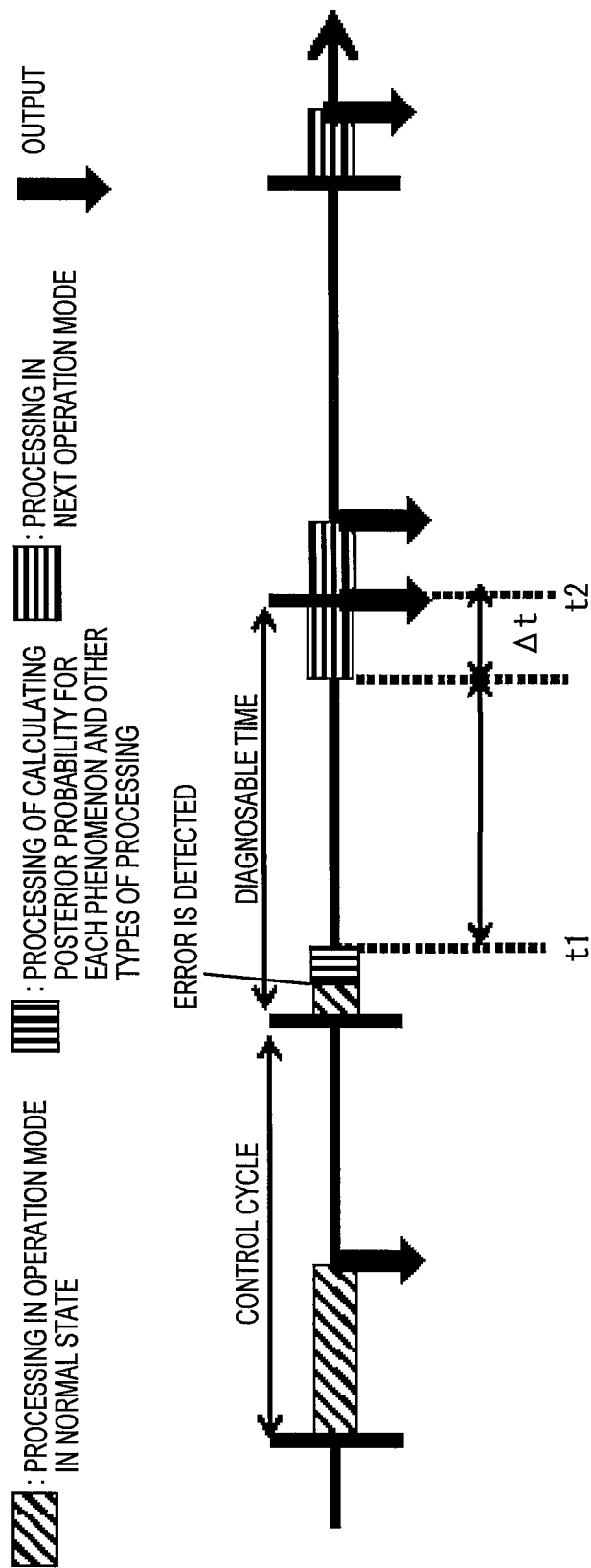
FIG. 10 is an explanatory diagram for illustrating a diagnosable time in the control device according to the first embodiment of the present invention.

In FIG. 10, the calculation unit 11 is cyclically activated and outputs a control value in normal operation. When an error is detected, the calculation unit 11 outputs a control value in the next operation mode determined by the failure diagnosis unit 12 as described later.

When the current time is given as t1, the time of the next deadline is given as t2, and the processing time per cycle in the next operation mode is given as $\Delta t$, the diagnosable time is expressed by the expression below.

$$t2-t1-\Delta t$$

It is required in this case to define, for each operation mode, the processing time $\Delta t$ per cycle in advance, and a field for the processing time $\Delta t$ is added to, for example, the operation mode determination table 323. However, the diagnosable time is not always required to be equal to the control cycle.

That is, in the case of a system capable of tolerating the skipping of several cycles of the calculation unit 11 by employing the value of the last time when the calculation unit 11 skips a cycle, that is, when there is no output, the diagnosable time is set taking the acceptable cycle skipping count into consideration. In the case of a system in which a redundant system is built in so that, when an error is detected in one system, the operation can be continued in another system, the diagnosable time is set based on the system's specifications irrespective of the control cycle.

Referring back to FIG. 9, the failure diagnosis unit 12 determines a set of phenomena on which a diagnosis is to be conducted, based on the posterior probabilities of phenomena stored in the posterior failure probability table 321, the diagnosable time obtained in Step S201, and the diagnosis times of phenomena stored in the diagnosis time table 322 (Step S202).

Specifically, the failure diagnosis unit 12 determines, as a set of phenomena on which a diagnosis is to be conducted, a combination of phenomena that has the largest sum of posterior probabilities out of combinations of phenomena whose total diagnosis time is within the diagnosable time.

After determining a set of phenomena on which a diagnosis is to be conducted, the failure diagnosis unit 12 conducts a diagnosis on the set of phenomena in descending order of posterior probability (Step S203, Step S204, and Step S205).

Specifically, the failure diagnosis unit 12 first determines whether a diagnosis has been conducted for all of the phenomena (Step S203).

When it is determined in Step S203 that not all phenomena have been diagnosed (i.e., when the determination is "No"), the failure diagnosis unit 12 conducts a diagnosis on a phenomenon having the highest posterior probability out of phenomena that have not been diagnosed (Step S204), and determines whether a phenomenon that is the cause of the error has successfully been identified (Step S205).

When it is determined in Step S205 that causal phenomenon has not been identified (i.e., when the determination is "No"), the failure diagnosis unit 12 returns to Step S203 to again determine whether a diagnosis has been conducted for all phenomena.

When it is determined in Step S203 that every phenomenon has been diagnosed (i.e., when the determination is "Yes"), or when it is determined in Step S205 that the causal phenomenon has successfully been identified (i.e., when the determination is "Yes"), on the other hand, the failure diagnosis unit 12 refers to the operation mode determination table 323 to determine the next operation mode (Step S206).

Specifically, when no phenomena has successfully been identified as the cause of the error as a result of conducting a diagnosis on all phenomena, the failure diagnosis unit 12 chooses an operation mode stored in the operation mode determination table 323 as the operation mode to be used when the identification of the causal phenomenon fails.

The failure diagnosis unit 12 next notifies the calculation unit 11 of a shift to the chosen operation mode (Step S207), and ends the processing of FIG. 9.

To summarize the processing steps described above, an error detected in error detection is received and, after the posterior probability is obtained for each phenomenon that may be the cause of the error, an acceptable function suspension time, which is a function suspension time acceptable to the system, is obtained. Meanwhile, a diagnosis time is obtained for each phenomenon in advance.

A set of phenomena having the largest sum of posterior probabilities is then selected based on the diagnosis time, out of sets of phenomena for which diagnosis takes a time shorter than the acceptable function suspension time. A failure diagnosis is conducted on the selected set of phenomena in descending order of posterior probability.

In this manner, a combination of phenomena having the largest sum of posterior probabilities is selected as a set of phenomena on which a diagnosis is to be conducted, out of combinations of phenomena that can be diagnosed within the diagnosable time, and a diagnosis is conducted on the set of phenomena in descending order of posterior probability, thereby finishing the diagnosis of a phenomena that is the cause of an error within the diagnosable time.

When an error occurs, the control device 1 can thus identify a phenomenon that is the cause of the error without stopping the operation of the system to the extent possible, and choose an operation mode adapted to the phenomenon, to thereby allow the system to keep operating.

An approach using multiplexing is one of methods that allow the system to keep operating despite a failure. In a system for managing a large-scale plant ora similar system, a failed system is determined by, for example, majority decision of triplex systems, which perform the same calculation, and the operation is continued only in normal systems.

In the case of a controller for an automated driving system, a controller for factory automation (FA), or a similar control device, on the other hand, cost and space limitations are heavy and it may not always be possible to implement a multiplex-system configuration.

The control device 1 according to the first embodiment of the present invention allows, to the extent possible, a single system to keep operating by identifying a phenomenon that is the cause of an error and choosing an operation mode adapted to the phenomenon. The control device 1 is therefore particularly effective as a control device that has heavy limitations in cost and space.

The control device 1 also limits phenomena on which a diagnosis is to be conducted to phenomena that affect the selection of the next operation mode, thereby increasing the number of phenomena that can be diagnosed within the diagnosable time. This results in an additional effect in that the possibility of the continuity of operation is increased.

A controller for an automated driving system, a controller for FA, and a similar control system are considered to be heavier in time constraints and shorter in diagnosable time compared to a server-based system and an information system. The effect of the control device 1 according to the first embodiment of the invention, which is an increase in the number of phenomena that can be diagnosed within the diagnosable time, is therefore particularly effective to a system having heavy time constraints.

As described above, according to the first embodiment, the failure diagnosis unit calculates the diagnosable time, which indicates a period of time available to be spent on the identification of a phenomenon that is the cause of an error, and identifies, for each error detected by the error detection unit, a phenomenon that is the cause of the error based on the posterior probability, which is calculated for each phenomenon that may be the cause of the error as the probability of occurrence of the phenomenon, and on the diagnosis time, which is calculated for each phenomenon as the period of time required to identify the phenomenon as the cause of the error.

It is therefore possible to allow a system to which the control device is applied to, to the extent possible, keep operating without stopping even when an error is detected, by function fallback or other measures, and to identify a phenomenon that is the cause of the error.

Second Embodiment

In the first embodiment, the posterior probability is obtained in advance for each phenomenon and each error before the system is put into operation. However, the failure diagnosis unit 12 may be configured so as to obtain the posterior probability in error detection in anticipation for a case in which a plurality of errors are detected at once.

Figures 11, 12, 13:
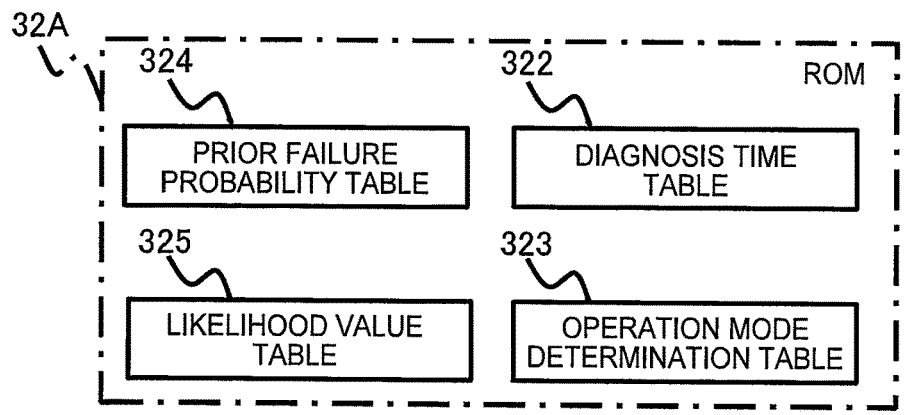
FIG. 11 is an explanatory diagram for illustrating a table that is stored on a ROM in a failure diagnosis microcomputer of a control device according to a second embodiment of the present invention.
FIG. 12 is an explanatory diagram for illustrating a prior failure probability table of the control device according to the second embodiment of the present invention.
FIG. 13 is an explanatory diagram for illustrating a likelihood value table of the control device according to the second embodiment of the present invention.

FIG. 11 is an explanatory diagram for illustrating a table that is stored on a ROM in a failure diagnosis microcomputer of a control device according to a second embodiment of the present invention. The configuration of a ROM 32A in FIG. 11 differs from the configuration of the ROM 32 described in the first embodiment with reference to FIG. 4 in points given below.

Specifically, in FIG. 11, the ROM 32A in the second embodiment of the present invention is provided with a prior failure probability table 324 and a likelihood value table 325 in place of the posterior failure probability table 321 on the ROM 32 described in the first embodiment with reference to FIG. 4. Other components illustrated in FIG. 11 are the same as in the first embodiment, and descriptions on the components are therefore omitted.

FIG. 12 is an explanatory diagram for illustrating the prior failure probability table of the control device according to the second embodiment of the present invention. In FIG. 12, the prior failure probability table 324 has a field for a phenomenon that may be the cause of an error, and a field for a prior probability, which is calculated for each phenomenon as the probability of occurrence of the phenomenon.

The prior probability of each phenomenon is obtained by the same method as in the first embodiment.

FIG. 13 is an explanatory diagram for illustrating the likelihood value table of the control device according to the second embodiment of the present invention. In FIG. 13, the likelihood value table 325 is a matrix table for showing a detected error and a phenomenon that may be the cause of the error. Each likelihood value is obtained by the same method as in the first embodiment.

Figure 14:
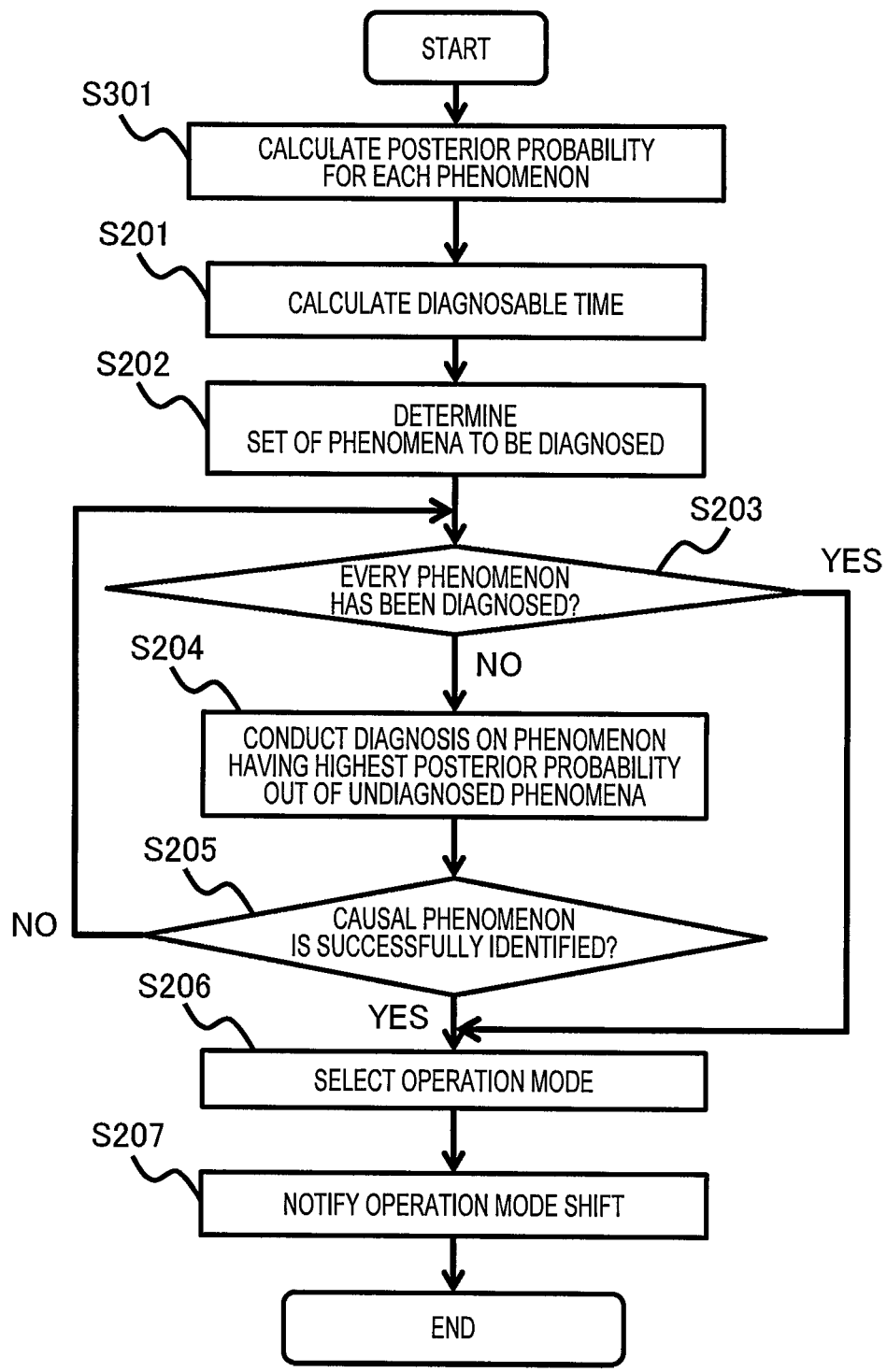
FIG. 14 is a flow chart for illustrating processing to be executed in a failure diagnosis unit of the control device according to the second embodiment of the present invention.

FIG. 14 is a flow chart for illustrating processing to be executed in the failure diagnosis unit of the control device according to the second embodiment of the present invention. The processing of the failure diagnosis unit 12 in FIG. 14 differs from the processing described in the first embodiment with reference to FIG. 9 in a point given below.

In FIG. 14, the failure diagnosis unit 12 is activated and first calculates the posterior probability for each phenomenon (Step S301).

In the second embodiment of the present invention, a case in which a plurality of errors may be detected at once is assumed as described above. When a set of all detected errors is given as E, the posterior probability $P(M_j|E_i)$ of the phenomenon $M_j$ that is the cause of the single detected error $E_i$ is expressed by the Bayesian method as Expression (4).

$$P(M_j|E_i) \sim P(M_j) \cdot P(E_i|M_j) \quad (4)$$

The denominator term of the Bayesian method in Expression (1) of the first embodiment may be omitted for the same reason that is described in the first embodiment. From Expression (4), the posterior probability $P(M_j|E_i)$ of the phenomenon $M_j$ that is the cause of the detected errors E is expressed as Expression (5).

$$P(M_j|E) = P(M_j|E_1) \cdot P(M_j|E_2) \ldots P(M_j|E_n) \quad (5)$$

Processing steps in FIG. 14 other than Step S301 are the same as the processing steps described in the first embodiment, and descriptions on the processing steps are therefore omitted.

As described above, according to the second embodiment, the posterior probability of a phenomenon that may be the cause of an error is calculated after error detection, and thus, when a plurality of errors are detected at once, the posterior probability of a phenomenon under the condition that all errors are detected can be obtained.

Third Embodiment

In the first embodiment, a set of phenomena on which a diagnosis is to be conducted is determined by the failure diagnosis unit 12 in Step S202 as illustrated in FIG. 9. When the processing of determining a set of phenomena on which a diagnosis is to be conducted takes time, the failure diagnosis unit 12 may determine, instead of executing this step, each time a phenomenon is diagnosed, whether the completion of the next diagnosis is after expiration of the diagnosable time.

Figure 15:
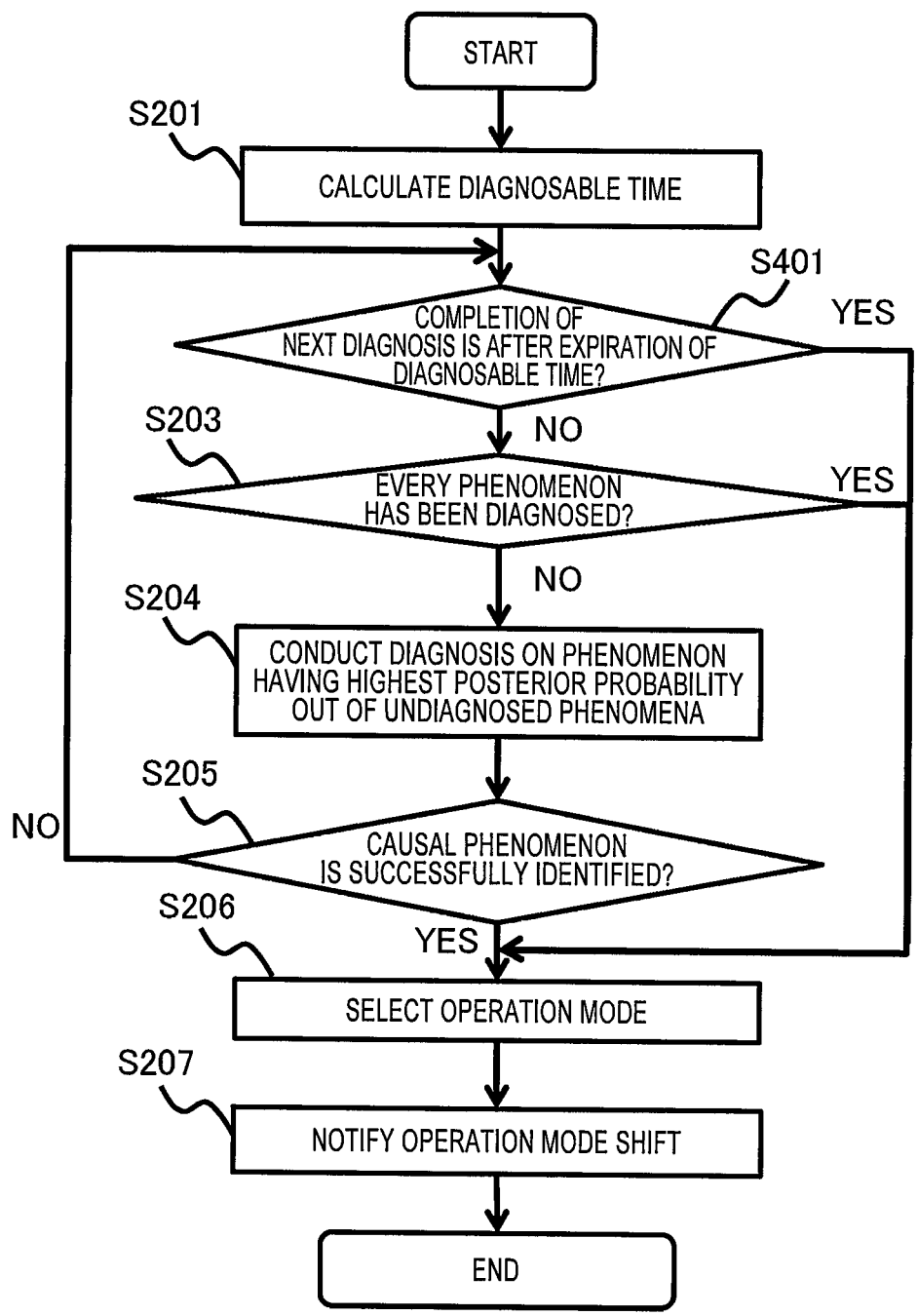
FIG. 15 is a flow chart for illustrating processing to be executed in a failure diagnosis unit of a control device according to a third embodiment of the present invention.

FIG. 15 is a flow chart for illustrating processing to be executed in the failure diagnosis unit of the control device according to the third embodiment of the present invention. The processing of the failure diagnosis unit 12 in FIG. 15 differs from the processing described in the first embodiment with reference to FIG. 9 in points given below.

Specifically, in FIG. 15, after calculating the diagnosable time (Step S201), the failure diagnosis unit 12 does not determine a set of phenomena on which a diagnosis is to be conducted (Step S202 of FIG. 9), and conducts a diagnosis on phenomena in descending order of posterior probability (Step S203, Step S204, and Step S205).

The difference is that, before starting the diagnosis of each phenomenon, the failure diagnosis unit 12 determines whether the completion of the diagnosis of the next phenomenon is after expiration of the diagnosable time (Step S401).

When it is determined in Step S401 that the completion of the diagnosis of the next phenomenon is after expiration of the diagnosable time (i.e., when the determination is "Yes"), the failure diagnosis unit 12 chooses an operation mode to be used when the identification of the causal phenomenon is a failure (Step S206).

Other processing steps in FIG. 15 are the same as the processing steps described in the first embodiment, and descriptions on the processing steps are therefore omitted.

As described above, according to the third embodiment, whether completion of the next diagnosis is after expiration of the diagnosable time is determined each time a phenomenon is diagnosed, and thus the processing of determining a set of phenomena on which a diagnosis is to be conducted can be omitted.

Fourth Embodiment

In the first embodiment, a set of phenomena on which a diagnosis is to be conducted is determined by the failure diagnosis unit 12 in Step S202 as illustrated in FIG. 9. The failure diagnosis unit 12 may diagnose the set of phenomena in the order of the expected value of the reciprocal of the diagnosis time.

Figure 16:
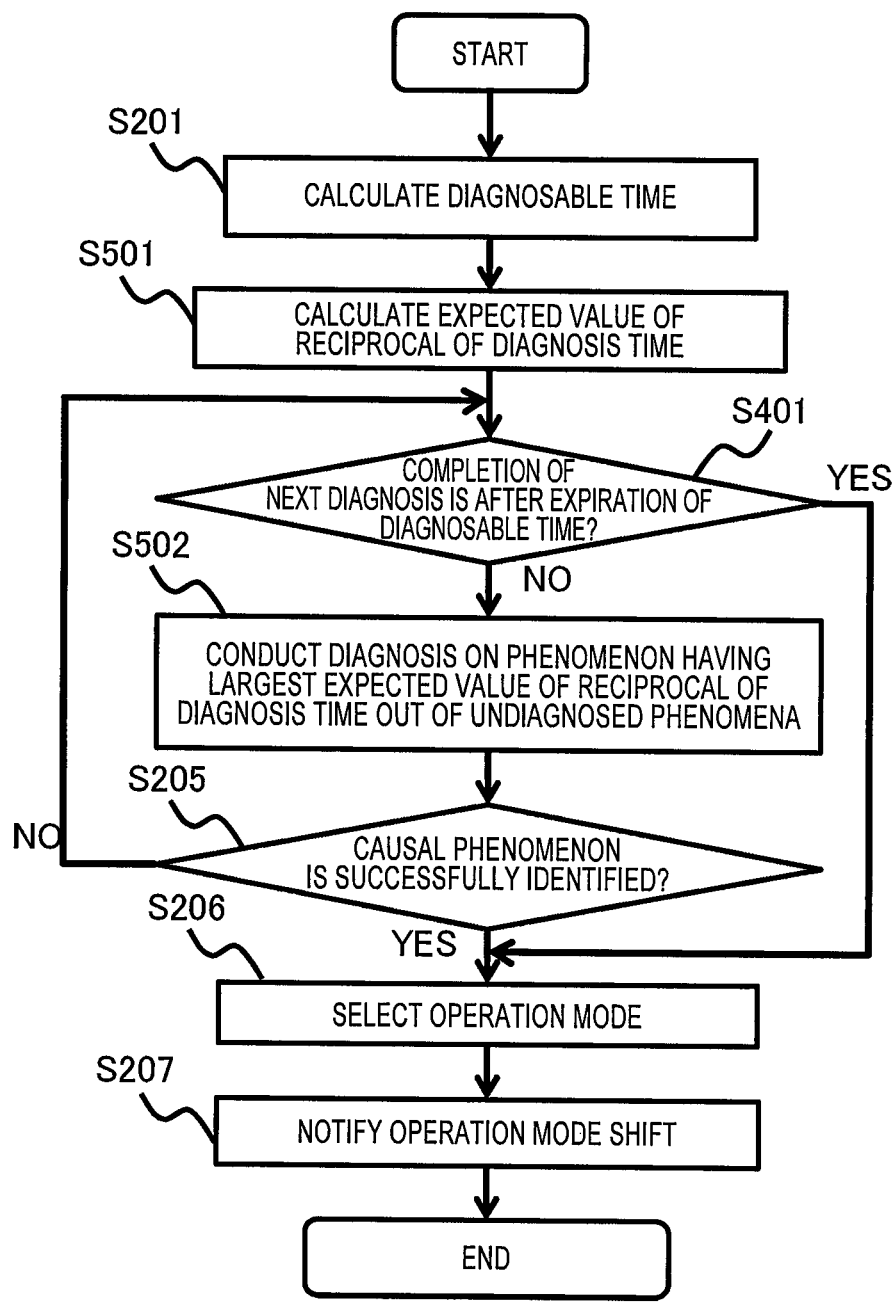
FIG. 16 is a flow chart for illustrating processing to be executed in a failure diagnosis unit of a control device according to a fourth embodiment of the present invention.

FIG. 16 is a flow chart for illustrating processing to be executed in the failure diagnosis unit of the control device according to the fourth embodiment of the present invention. The processing of the failure diagnosis unit 12 in FIG. 16 differs from the processing described in the other embodiments in points given below.

Specifically, in FIG. 16, after calculating the diagnosable time (Step S201), the failure diagnosis unit 12 calculates, for each phenomenon that may be the cause of the error, the expected value of the reciprocal of the phenomenon's diagnosis time (Step S501).

The expected value of the reciprocal of a phenomenon's diagnosis time is a product of the reciprocal of the phenomenon's diagnosis time stored in the diagnosis time table 322 and the phenomenon's posterior probability stored in the posterior failure probability table 321. The expected value of the reciprocal of the diagnosis time may be calculated in advance to be stored on the ROM 32.

Subsequently, the failure diagnosis unit 12 determines, before starting the diagnosis of each phenomenon, whether the completion of the diagnosis of the next phenomenon is after expiration of the diagnosable time (Step S401). When it is determined that the diagnosis of the next phenomenon is finished before expiration of the diagnosable time, a diagnosis is conducted starting from a phenomenon that has the highest expected value of the reciprocal of the diagnosis time out of phenomena that have not been diagnosed (Step S502).

Other processing steps in FIG. 16 are the same as the processing steps described in the first to third embodiments, and descriptions on the processing steps are therefore omitted.

As described above, according to the fourth embodiment, phenomena are diagnosed in the order of the expected value of the reciprocal of the diagnosis time, and thus a diagnosis in which the shortening of the time required for diagnosis is given top priority can be conducted.

Specifically, in the first embodiment to the third embodiment, in which the main purpose is to maximize the probability of completing phenomenon identification within the diagnosable time, are suitable to a system whose value is unaffected by how long or how short the diagnosis takes as long as the identification is finished within the diagnosable time.

In the fourth embodiment of the present invention, on the other hand, while the maximization of the probability of completing phenomenon identification within the diagnosable time is not always accomplished, the expected value of the time required to finish phenomenon identification can be minimized. The fourth embodiment of the present invention is effective for a soft real-time system or a similar system whose value decreases gradually as the time required to finish processing lengthens.

Fifth Embodiment

In the first embodiment, as illustrated in FIG. 9, a set of phenomena on which a diagnosis is to be conducted is determined by the failure diagnosis unit 12 in Step S202. The failure diagnosis unit 12 may diagnose the set of phenomena in the order of the expected value of the function level, which is assigned to each operation mode.

FIG. 17 is an explanatory diagram for illustrating an operation mode determination table of the control device according to the fifth embodiment of the present invention. An operation mode determination table 323A in FIG. 17 has a function level field in addition to the fields in the operation mode determination table 323 described in the first embodiment with reference to FIG. 7. In this example, a larger value of the function level indicates a higher function.

Figure 18:
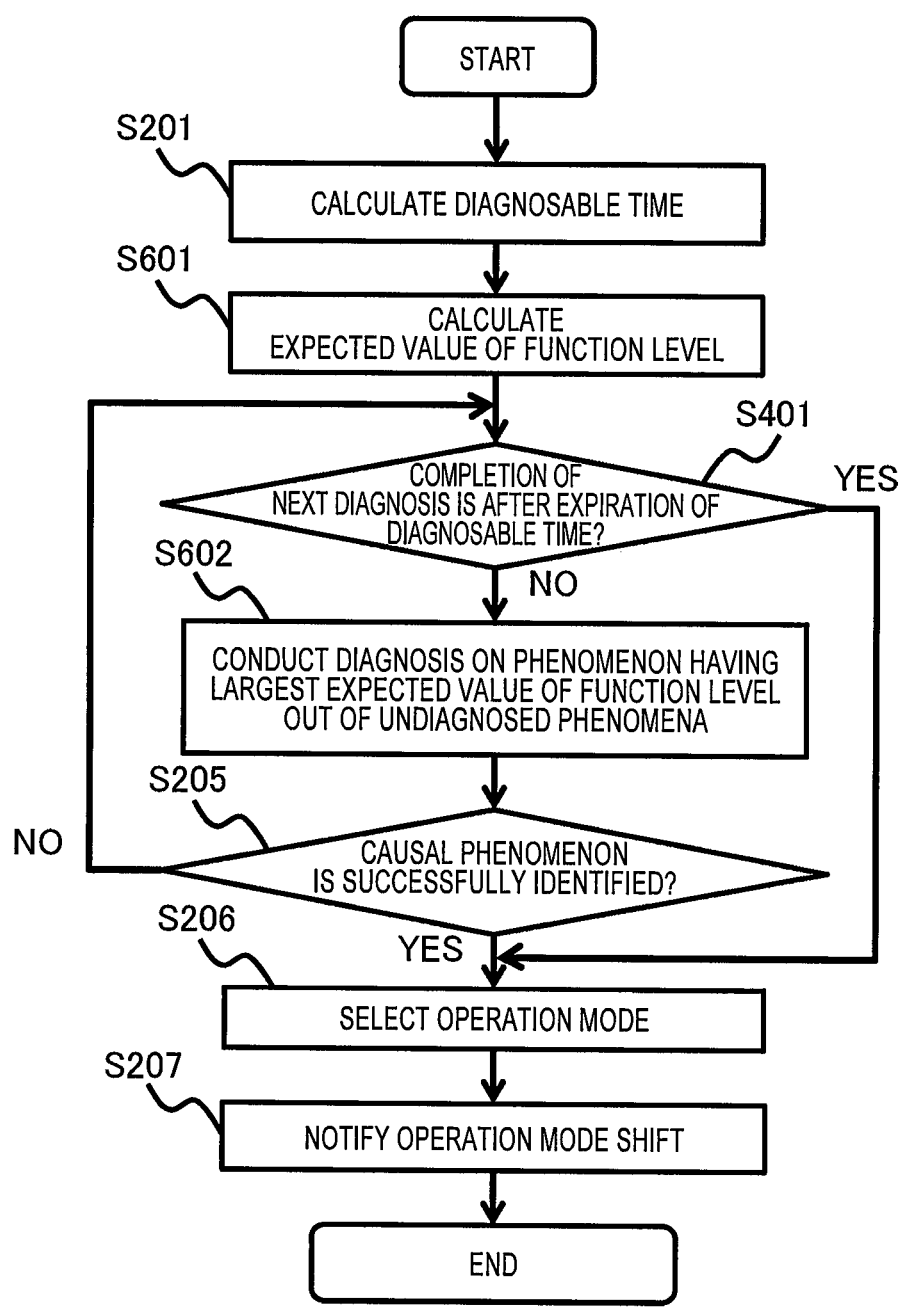
FIG. 18 is a flow chart for illustrating processing to be executed in a failure diagnosis unit of the control device according to the fifth embodiment of the present invention.

FIG. 18 is a flow chart for illustrating processing to be executed in the failure diagnosis unit of the control device according to the fifth embodiment of the present invention. The processing of the failure diagnosis unit 12 in FIG. 18 differs from the processing described in other embodiments in points given below.

Specifically, in FIG. 18, after calculating the diagnosable time (Step S201), the failure diagnosis unit 12 calculates an expected value of the function level (Step S601).

The expected value of the function level associated with a phenomenon is a product of the function level in the operation mode determination table 323A and the phenomenon's posterior probability stored in the posterior failure probability table 321. The expected value of the function level may be calculated in advance to be stored on the ROM 32.

Subsequently, the failure diagnosis unit 12 determines, before starting the diagnosis of each phenomenon, whether the completion of the diagnosis of the next phenomenon is after expiration of the diagnosable time (Step S401). When it is determined that the diagnosis of the next phenomenon is finished before expiration of the diagnosable time, a diagnosis is conducted starting from a phenomenon that has the highest expected value of the function level out of phenomena that have not been diagnosed (Step S502).

Other processing steps in FIG. 18 are the same as the processing steps described in the first to third embodiments, and descriptions on the processing steps are therefore omitted.

As described above, according to the fifth embodiment, a diagnosis is conducted in the order of the expected value of the function level, and thus the chance of a shift to a high function operation mode can be increased.

REFERENCE SIGNS LIST 1 control device, 11 calculation unit, 12 failure diagnosis unit, 13 error detection unit

The invention claimed is:

1. A control device, comprising:
 a failure diagnosis microcomputer configured to identify a phenomenon that is a cause of the detected error, and
 a calculation microcomputer configured to shift an operation mode in response to a notification from the failure diagnosis microcomputer,
 wherein the failure diagnosis microcomputer is configured to:
 calculate a diagnosable time available to be spent on the identification of the phenomenon that is the cause of the error; and
 identify, for each detected error, a phenomenon that is the cause of the error based on a posterior probability, which is calculated for each phenomenon that is likely to be the cause of the error as a probability of occurrence of the phenomenon, on a diagnosis time, which is obtained for each phenomenon as a period of time required to identify the phenomenon as the cause of the error, and on the diagnosable time.

2. The control device according to claim 1, wherein the failure diagnosis microcomputer is configured to select, as a set of phenomena on which a diagnosis is to be conducted, a combination of phenomena that has a largest sum of posterior probabilities out of combinations of phenomena that are likely to be the cause of the error and that have a total diagnosis time shorter than the diagnosable time, and to diagnose the set of phenomena in descending order of the posterior probability.

3. The control device according to claim 2, wherein the calculation microcomputer is further configured to perform control calculation, which is a main function of the control device,
 wherein the failure diagnosis microcomputer is configured to store next operation modes to be used in the calculation microcomputer when a phenomenon that is the cause of the error is successfully identified and when the identification of the phenomenon that is the cause of the error fails, select an operation mode of the calculation microcomputer based on a result of the diagnosis, and notify the selected operation mode to the calculation microcomputer.

4. The control device according to claim 3, wherein the failure diagnosis microcomputer is configured to include, in phenomena that are likely to be the cause of the error and that are to undergo diagnosis, only a phenomenon that affects the next operation mode in the calculation microcomputer.

5. The control device according to claim 1, wherein the failure diagnosis microcomputer is configured to conduct a diagnosis in descending order of the posterior probability, determine, before the diagnosis of each phenomenon is started, whether completion of the diagnosis of the next phenomenon is after expiration of the diagnosable time, and end the diagnosis when it is determined that the completion of the diagnosis of the next phenomenon is after expiration of the diagnosable time.

6. The control device according to claim 5, wherein the failure diagnosis microcomputer is configured to calculate an expected value of a reciprocal of the diagnosis time from a product of the diagnosis time and the posterior probability, and to conduct a diagnosis in descending order of the expected value of the reciprocal of the diagnosis time.

7. The control device according to claim 6, wherein the calculation microcomputer is further configured to perform control calculation, which is a main function of the control device,
  wherein the failure diagnosis microcomputer is configured to store next operation modes to be used in the calculation microcomputer when a phenomenon that is the cause of the error is successfully identified and when the identification of the phenomenon that is the cause of the error fails, select an operation mode of the calculation microcomputer based on a result of the diagnosis, and notify the selected operation mode to the calculation microcomputer.

8. The control device according to claim 7, wherein the failure diagnosis microcomputer is configured to include, in phenomena that are likely to be the cause of the error and that are to undergo diagnosis, only a phenomenon that affects the next operation mode in the calculation microcomputer.

9. The control device according to claim 5, wherein the failure diagnosis microcomputer is configured to calculate, for each phenomenon that is likely to be the cause of the error, an expected value of a function level, which indicates a level of a function of a next operation mode of the calculation microcomputer that is associated with the phenomenon, from a product of the function level and the posterior priority, and to conduct a diagnosis in descending order of the expected value of the function level.

10. The control device according to claim 9, wherein the calculation microcomputer is further configured to perform control calculation, which is a main function of the control device,
  wherein the failure diagnosis microcomputer is configured to store next operation modes to be used in the calculation microcomputer when a phenomenon that is the cause of the error is successfully identified and when the identification of the phenomenon that is the cause of the error fails, select an operation mode of the calculation microcomputer based on a result of the diagnosis, and notify the selected operation mode to the calculation microcomputer.

11. The control device according to claim 10, wherein the failure diagnosis microcomputer is configured to include, in phenomena that are likely to be the cause of the error and that are to undergo diagnosis, only a phenomenon that affects the next operation mode in the calculation microcomputer.

12. The control device according to claim 5, wherein the calculation microcomputer is further configured to perform control calculation, which is a main function of the control device,
  wherein the failure diagnosis microcomputer is configured to store next operation modes to be used in the calculation microcomputer when a phenomenon that is the cause of the error is successfully identified and when the identification of the phenomenon that is the cause of the error fails, select an operation mode of the calculation microcomputer based on a result of the diagnosis, and notify the selected operation mode to the calculation microcomputer.

13. The control device according to claim 12, wherein the failure diagnosis microcomputer is configured to include, in phenomena that are likely to be the cause of the error and that are to undergo diagnosis, only a phenomenon that affects the next operation mode in the calculation microcomputer.

14. The control device according to claim 1, wherein the calculation microcomputer is further configured to perform control calculation, which is a main function of the control device,
  wherein the failure diagnosis microcomputer is configured to store next operation modes to be used in the calculation microcomputer when a phenomenon that is the cause of the error is successfully identified and when the identification of the phenomenon that is the cause of the error fails, select an operation mode of the calculation microcomputer based on a result of the diagnosis, and notify the selected operation mode to the calculation microcomputer.

15. The control device according to claim 14, wherein the failure diagnosis microcomputer is configured to include, in phenomena that are likely to be the cause of the error and that are to undergo diagnosis, only a phenomenon that affects the next operation mode in the calculation microcomputer.

16. The control device according to claim 1, wherein the failure diagnosis microcomputer is configured to store the posterior probability in advance, and when an error is detected, call up the stored posterior probability to identify a phenomenon that is the cause of the error.

17. The control device according to claim 1, wherein the failure diagnosis microcomputer is configured to calculate, after a plurality of errors have occurred and are detected at once, a posterior probability for each phenomenon that is likely to be the cause of a set of the plurality of errors.

18. A processing method in the event of a failure in a control device, which is executed in the control device including a failure diagnosis microcomputer configured to identify a phenomenon that is a cause of the detected error, and, a calculation microcomputer configured to shift an operation mode in response to a notification from the failure diagnosis microcomputer,
  the processing method comprising the steps of:
  calculating, by the failure diagnosis microcomputer, a diagnosable time available to be spent on the identification of the phenomenon that is the cause of the error; and
  identifying, by the failure diagnosis microcomputer, for each detected error, a phenomenon that is the cause of the error based on a posterior probability, which is calculated for each phenomenon that is likely to be the cause of the error as a probability of occurrence of the phenomenon, on a diagnosis time, which is obtained for each phenomenon as a period of time required to identify the phenomenon as the cause of the error, and on the diagnosable time.

* * * * *